Figure 1:
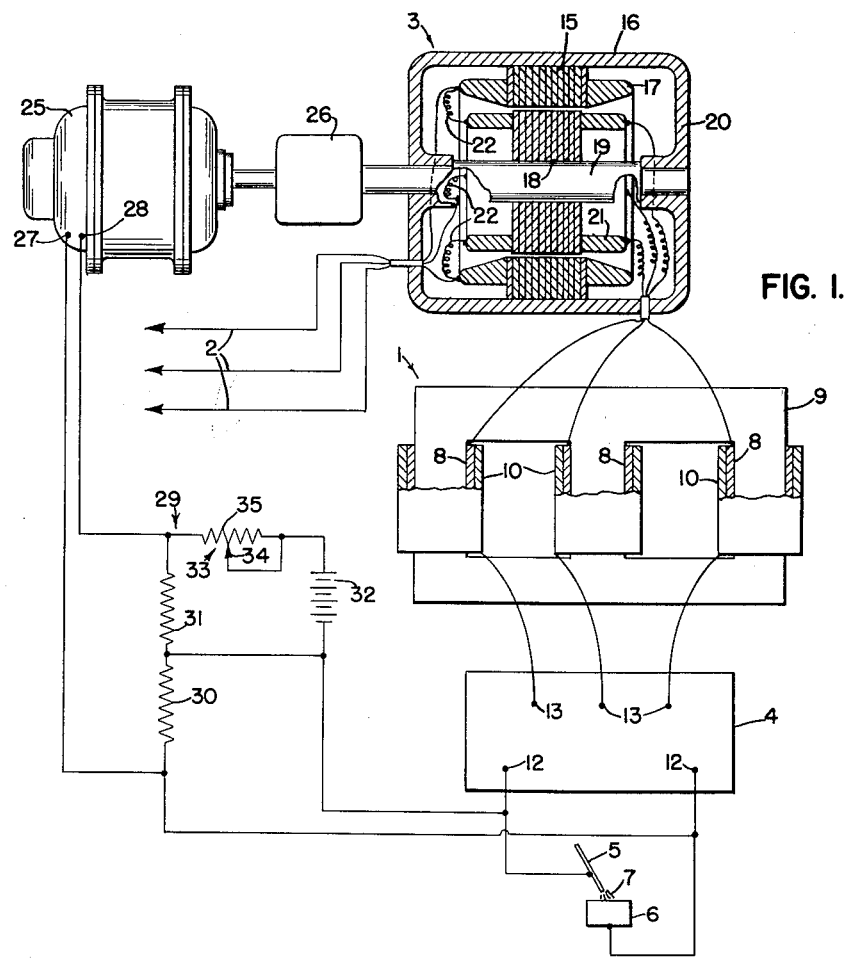

Dec. 4, 1962    A. E. JOHNSON    3,067,377
OUTPUT CONTROL FOR ARC WELDING MACHINES
Filed Aug. 27, 1958

INVENTOR.
ARTHUR E. JOHNSON
BY
Andrus + Starke
Attorneys

United States Patent Office 3,067,377
Patented Dec. 4, 1962

3,067,377
OUTPUT CONTROL FOR ARC WELDING MACHINES
Arthur E. Johnson, Elkhorn, Wis., assignor to A. O. Smith Corporation, Milwaukee, Wis., a corporation of New York
Filed Aug. 27, 1958, Ser. No. 757,531
3 Claims. (Cl. 321—18)

This invention relates to an output control for an arc welding machine and particularly to an arc welding transformer control which establishes a continuous stepless control and which is suitable for remote operation.

The great expansion of joining members by arc welding has developed applications where it is desirable to establish continuous and progressive control of the welding power. This is particularly true in the commonly denoted constant potential welding process which employs a high intensity arc. In the constant potential process, the voltage applied across the arc is taken from a constant potential source and the current is determined by the rate of electrode feed. In contrast, a constant current process employs a highly drooping voltage versus current source such that the arc voltage varies with the length of the arc while the current remains relatively constant.

Certain applications necessitate relatively wide separation of work and power source and a remote foot or hand control device is required to adjust the current or voltage setting. Further, in certain other applications, the current or voltage is adjusted during the welding operation and consequently a readily operated control must be provided. The welding output change may be relatively large and require stopping of the welding operation in order to adjust the power output.

Arc welding transformers employing relatively movable primary and secondary windings have found wide application in the welding industry and provide highly satisfactory arc welding outputs at low cost for constant current welding processes. However, to adjust the current output generally requires returning to the welding transformer and mechanically moving the coils by manually operating a suitable handle or the like. It is difficult to establish remote control of the movable coils because of the great weight of the coils.

Saturable reactor controls have been employed to overcome the problem of remote control and to vary the control of constant potential machines within relatively small output ranges. Taps are usually provided to allow change from one range to another. Although providing satisfactory remote control, the power factor and output wave shape change accompanying such an inductive control, creates difficulties which must be compensated for.

In conventional three-phase, full-wave rectifier, direct current machines, the variation or change in the wave shape in the alternating current circuit results in the output current containing a superimposed alternating current component which is approximately 30% in saturable reactor control machines, as contrasted to a 6% component in a movable coil machine.

The present invention is directed to a simple, stepless output control which is particularly adapted for remote operation.

In accordance with the present invention, an induction regulator means is inserted or connected in the circuit between the incoming power lines and the input to the welding transformer. The induction regulator means is controlled to adjust the welding output. An induction regulator means provides continuous stepless control over the complete output range. An induction regulator has essentially balanced magnetic forces and is a relatively zero torque device. An induction regulator may therefore be readily adjusted and a small inexpensive servomechanism can be supplied for remote control. Feedback control means to adjust for variations in the incoming line voltage and/or welding conditions can also be economically built into the apparatus. Feedback control to compensate for variations in line voltage is particularly necessary in the constant potential process to establish a very stable arc. As the reactance of the device is relatively negligible, no power factor disturbances or wave shape changes are inserted into the welding circuit. The maintaining of the wave shape is particularly important in direct current machines to reduce the alternating current component in the direct current output.

The drawing furnished herewith illustrates the best mode presently contemplated for carrying out the invention.

Figure 2:
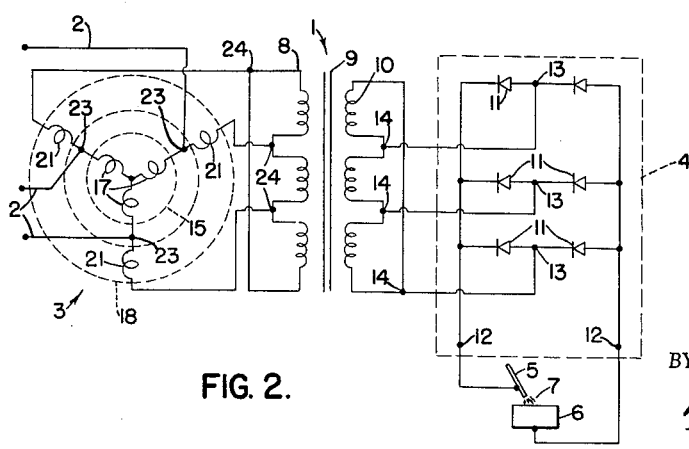

In the drawing:

FIG. 1 is a diagrammatic illustration of an induction regulator and a constant potential output welding transformer connected to a rectifying means to establish a direct current output suitable for arc welding; and FIG. 2 is a schematic circuit diagram of the direct current arc welding unit of FIG. 1.

Referring to the drawing and particularly to FIG. 1 thereof, an arc welding transformer 1 of the three-phase variety is shown connected to a set of three-phase power lines 2 of the conventional sixty cycle distribution system, or the like. A three-phase induction regulator 3 is inserted between the incoming power lines 2 and the arc welding transformer 1 to permit selective adjustment of the voltage applied to the transformer and thereby to control the output voltage of the transformer. A full wave rectifier 4, shown in block diagram in FIG. 1, is connected across the output of transformer 1 to convert the alternating current output of transformer 1 to a direct current suitable for arc welding. An electrode 5 and a workpiece 6 are connected to opposite sides of the rectifier output, and an arc 7 is established therebetween upon completion of the circuit to the power lines.

Referring to FIGS. 1 and 2, the arc welding transformer 1 is a conventional close-coupled three-phase power transformer. A delta-connected primary winding 8 includes three separate windings which are each wound upon a different leg of a three-legged magnetic core or frame 9. A delta-connected secondary winding 10 includes three separate windings which are wound one to each of the legs of the magnetic core 9. The windings of the secondary 10 are wound superposed upon the delta-connected primary winding 8 to establish close coupling therebetween. The close superposition of the primary and secondary windings establishes the conventional constant voltage transformer presently employed in arc welding circuits. The output voltage is consequently determined by the voltage impressed across the primary winding and is essentially independent of the arc load 7. The ratio of the primary winding 8 and the secondary winding 10 is such that the output voltage of the transformer 1 is suitable for arc welding.

In the illustrated embodiment, the full wave rectifier 4 is connected across the output of the transformer secondary 10 to establish a relatively constant direct current to the arc 7.

Referring particularly to FIG. 2, the rectifier 4 is shown as a conventional full wave bridge type rectifying circuit for a three-phase alternating current input. Six rectifying elements or units 11 are connected in three parallel series pairs with corresponding end poles connected to establish a pair of output terminals 12 which are connected respectively to the electrode 5 and the work 6. Input terminals 13 to the rectifier 4 are located intermediate each of the series connected rectifying units 11 and are connected respectively one each to each of the common junctions 14 of the delta-connected secondary 10.

The rectifier 4 establishes a direct current which as shown in the drawings, permits current to flow from the electrode 5 to the work 6 establishing arc 7. The magnitude of the current in the arc 7 is controlled by operation of regulator 3 to adjust the level of the input voltage to the transformer 1 and change the output voltage accordingly.

Referring particularly to FIG. 1, a three-phase round-wound induction regulator 3 is diagrammatically illustrated. This type of regulator is similar to the conventional round-wound, three-phase induction motor and includes a relatively stationary annular stator 15 rigidly supported within an annular frame 16. The inner periphery of the stator 15 is provided with a plurality of circumferentially spaced and axially extending winding slots, not shown. A three-phase distributed stator winding 17, which includes three interconnected windings is wound within the stator slots. Referring to FIG. 2, winding 17 is connected in Y and the parts thereof are electrically spaced from each other by 120 degrees. The winding 17 is connected to the three-phase incoming power lines 2 to establish a rotating magnetic field within the stator 15, in the conventional manner. A rotor 18 is mounted on a shaft 19 which is supported by the end frames 20 of frame 16 to dispose the rotor 18 in inductive relation to the stator 15. A secondary winding 21 is wound on the rotor 18 within a plurality of circumferentially distributed and axially extending winding slots, not shown. Referring particularly to FIG. 2, the secondary winding 21 includes three separate windings which are electrically spaced 120 degrees from each other in accordance with the spacing of the primary winding 18.

Extensible jumper leads 22 connect the corresponding ends of the secondary winding 21 and stator or primary winding 17 to establish input terminals 23 to the induction regulator 3 for power lines 2. The jumper leads 22 which joint the primary and secondary windings of the regulator 3 are shown coiled to allow angular positioning of the rotor 18 with respect to the stator 15.

The opposite ends of the secondary winding 21 are connected to three transformer input terminals 24 formed by the junctions within the delta-connected transformer primary 8.

The current to arc 7 is adjusted by angular positioning the rotor 18 relative to the stator 15 and consequently changing the coupling between the primary winding 17 and the secondary winding 21 and the voltage impressed on the welding transformer 1. The primary and secondary windings 17 and 21 are wound in such a manner as to essentially eliminate the inductive effect of the secondaries in the arc welding circuit.

To permit remote control of the welding current, a motor 25 is coupled to the rotor shaft 19 of the induction regulator 3 by a suitable gear reducing mechanism 26. The motor 25 is preferably a reversible direct current variety having the direction of rotation determined by the direction of energization. A pair of input power terminals 27 and 28 are provided and the direction of rotation of the motor 25 depends upon which of the terminals 27 and 28 is positive with respect to the opposite terminal.

The motor 25 is selectively energized to establish and maintain a predetermined output voltage by a comparison control circuit 29 which compares the output voltage across terminals 12 with a preselected control voltage, as shown in FIG. 1.

The comparison circuit includes a pair of resistors 30 and 31 which are series-connected across the pair of input terminals 27 and 28 to the motor 25. The one resistor 30 is connected to the output terminals 12 in parallel with the arc 7 and the voltage drop consequently corresponds to the output voltage. The other resistor 31 is connected across a battery 32 in series with a rheostat 33 having a manually adjustable tap 34 slidably engaging a series-connected resistance element 35. Adjustment of tap 34 varies the resistance inserted in series with the battery 32 and resistor 31 and thereby varies the voltage which appears across the resistor 31. The battery 32 is connected to establish a voltage drop in the associated resistor 31 which opposes the voltage across the output-controlled, series-connected resistor 30. Therefore, if the output voltage equals the preset voltage across the resistor 31, the net voltage appearing across the series resistors 30 and 31 and therefore across the motor terminals 27 and 28 is zero.

If the output voltage is higher, the voltage across the resistor 30 is greater and motor terminal 27 is positive and the motor 25 is energized to drive the induction regulator in a direction to reduce the output voltage. When the output voltage and preset voltage are equal, the motor 25 is again de-energized.

If the output voltage is lower, the voltage across the resistor 31 is greater and the opposite motor terminal 28 is positive. Motor 25 is now reversely energized to drive the induction regulator 3 in an opposite direction to increase the output voltage until it equals the present voltage.

The rheostat 33 is suitably calibrated and may be mounted on the machine, or by using suitable control lines may be made movable for remote control for welding operations which are removed from the welding power source and the like. The direct current level in the comparison circuit may be very small by suitable selection of components, and consequently the control is easily moved to various welding stations.

The operation of the illustrated embodiment of the invention is as follows:

The electrode 5 and work 6 are connected to the respective output terminals 12 of the rectifier 4.

The rheostat tap 34 is set at the desired output voltage position on the rheostat element 35.

The incoming power lines 2 are connected to input junctions 23 of the induction regulator 3. The currents in the primary regulator winding 17 produce a rotating magnetic field of constant magnitude in the air gap between the stator 15 and rotor 18. The magnetic flux, not shown, induces a voltage in the secondary winding 21 which is of a constant magnitude but whose phase with respect to the primary voltage varies when the rotor 18 is turned into different angular positions with respect to the stator 15. The voltage across each individual secondary phase winding on the rotor 18 equals the vector sum of the associated primary phase winding on the stator 15 and the secondary phase voltage which is induced by the rotating magnetic field. The sum and difference of these two voltages for any given fixed primary voltage defines a locus which approximates a circle. Consequently, any value of secondary terminal voltage between the numerical difference and sum of these two voltages can be obtained through the medium of angularly positioning the rotor 18.

The output voltage across the terminals 12 which appears across resistor 30, is compared to the preset voltage across the resistor 31 and as previously described, energizes the motor 25 to position the induction regulator 3 and thereby establish the predetermined output voltage desired. Further, during the welding operation, any change in the output voltage due to variations in the line voltage or the arc circuit results in an immediate change in the energization of the motor 25 to re-establish the preselected output voltage.

The output voltage of transformer 1 is directly proportional to the input voltage and is consequently regulated by the changes in the output voltage of the regulator 3. The arc welding current is proportional to the transformer output voltage in a constant potential transformer as described and illustrated. Thus, the welding current may be readily adjusted prior to or during a welding operation.

The change in the voltage which is impressed upon the primary winding 8 of the transformer 1 is a smooth, stepless change. Relatively small, controlled angular movement of the regulator rotor 18 can be made to cover the complete output range of the conventional arc welding machine without the use of additional taps and the like. This is particularly advantageous when the incoming line voltage varies because the regulator can compensate for any amount of variation. In reactor controls employing taps to establish various welding output ranges, the degree of compensation is restricted to the particular tap setting range. If a line voltage change greater than the difference between the output setting and the corresponding upper or lower limit does occur, the welding operation must be stopped and the tap moved to a new range.

Although the apparatus has been specifically described for direct current arc welding control machines, the system of control is equally applicable to alternating current arc welding outputs. In both forms of welding, the lack of distortion of the output current wave by the regulating apparatus is desirable to maintenance of a stable arc.

Because the induction regulator is essentially a non-inductive type control, there is no power factor disturbance inserted in the arc welding circuit as with a saturable reactor type control.

The regulator control may be inserted in the secondary circuit to establish equal control. However, the regulator windings then carry the relatively heavy welding currents and must be wound of large gage conductors. The winding operation in fabricating the regulator would consequently be difficult and expensive.

The illustrated three-phase induction regulator 3 can be replaced with three separate single-phase regulators connected between the incoming lines 2 and three windings of the transformer primary winding 8. A single-phase welding circuit would use a single-phase regulator.

The present invention provides a sensitive, stepless control of an arc welding transformer output. The control apparatus is relatively inexpensive and establishes a wide range of output currents comparable to the complete output range of present-day units without the necessity for a plurality of taps employed in conventional machines. The control mechanism is readily adjusted and consequently is particularly adapted for remote control employing a low energy control power.

Various modes of carrying out the invention are contemplated as being within the scope of the following claims particularly pointing out and distinctly claiming the subject matter which is regarded as the invention.

I claim:

1. An arc welding machine, which comprises a constant potential transformer having an input circuit and adapted to establish an output voltage suitable for arc welding, an induction regulator connected in the input circuit to said transformer and adapted to selectively vary the output voltage level, said induction regulator being constructed to establish a minimal impedance in the transformer input circuit, an electromagnetic drive means coupled to selectively position said induction regulator to establish preselected welding currents, and manually adjustable switch means connected in circuit with said drive means to selectively energize said electromagnetic means.

2. An arc welding machine, which comprises a transformer having an input circuit and adapted to establish an output voltage suitable for arc welding, a full wave rectifying circuit connected to said output voltage to establish a direct current output suitable for arc welding, an induction regulator connected in the transformer circuit and adapted to selectively vary the output voltage level, direct current controlled drive means adapted to position said induction regulator, a pair of series connected resistance elements connected across the input to said drive means, one of said resistance elements being connected across the output of the rectifying circuit to establish a first input voltage signal in proportion to the output voltage, and an adjustable direct current source connected across the other of said resistance elements to selectively establish a second input voltage signal in proportion to a desired output voltage, the voltages across said resistance elements being opposed to each other to establish positive and negative control voltage in accordance with the relative amplitude of the individual voltages to position said induction regulator and establish a voltage output in accordance with said second input voltage.

3. An arc welding machine in accordance with claim 1 having a full wave rectifier connected to the transformer to establish a direct current output voltage for direct current arc welding.

References Cited in the file of this patent

UNITED STATES PATENTS

| | | |
|---|---|---|
| 1,567,607 | Lehr | Dec. 29, 1925 |
| 1,642,031 | Kehoe | Sept. 13, 1927 |
| 1,928,848 | Crout | Oct. 3, 1933 |
| 2,027,235 | Klemperer | Jan. 7, 1936 |
| 2,136,248 | McLachlan | Nov. 8, 1938 |
| 2,246,118 | West | June 17, 1941 |
| 2,361,248 | Veinott et al. | Oct. 24, 1944 |
| 2,373,208 | Trucksess | Apr. 10, 1945 |
| 2,773,970 | Galbraith et al. | Dec. 11, 1956 |
| 2,891,211 | Stonehouse | June 16, 1959 |